Figure 1:
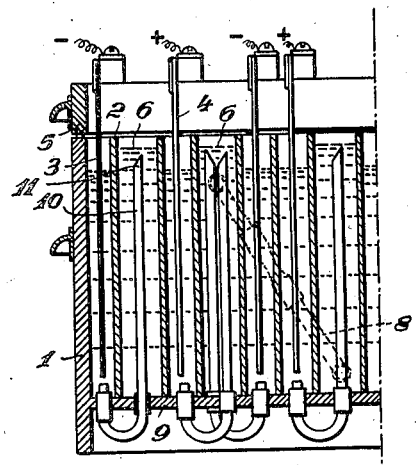

March 6, 1934.   O. GERTH   1,949,467

ELECTRO-OSMOTIC PURIFICATION OF LIQUIDS

Filed June 24, 1929   2 Sheets-Sheet 1

Inventor
Oswald Gerth
By Cromwell, Greist & Warden
Attys.

Patented Mar. 6, 1934

1,949,467

UNITED STATES PATENT OFFICE 1,949,467

ELECTRO-OSMOTIC PURIFICATION OF LIQUIDS

Oswald Gerth, Berlin-Wilmersdorf, Germany, assignor to Siemens-Elektro-Osmose G. m. b. H., Siemensstadt, near Berlin, a corporation of Germany Application June 24, 1929, Serial No. 373,168
In Germany June 27, 1928

6 Claims. (Cl. 204—1)

My invention relates to an apparatus and process for the treatment of liquids, and it more particularly relates to an apparatus and process adapted to be applied to the electro-osmotic purification of water.

Processes and apparatus for the electro-osmotic treatment of liquids are usually characterized by flowing a liquid under treatment past and in electrical contact with a pair or a series of pairs of cathodes and anodes. The liquid under treatment is separated from immediate contact with both of the electrodes of the pair, or from one of the electrodes of the pair, by means of a permeable diaphragm and also by means of other bodies of liquids. Ordinarily the space between any pair of positive and negative electrodes is divided into three portions by means of two diaphragms. The central or intermediate portion between the two diaphragms contains the liquid undergoing treatment, while the portions between each electrode and the adjacent diaphragm contain the electrode wash liquids. During the treatment or purification process the liquids to be treated and the electrode wash liquids are supplied to these spaces; and after having undergone treatment or after having performed the desired amount of washing, they are removed to waste or to another electro-osmotic cell. When water is being treated or purified, the raw water being supplied to the central space or compartment may also be utilized as wash water for the electrode compartments.

In a form of apparatus frequently employed, there are a number of cells through which the liquid being treated flows in series, while the electrode wash liquids are supplied to and removed from each cell separately. The bodies of wash liquid are maintained apart from the bodies of liquid undergoing treatment or purification in the manner previously described. In the wash liquids collect certain products of the electro-chemical reactions taking place at the electrodes, these products causing the anodic wash liquids to become acidic and the cathodic wash liquids to become alkaline. It is for the purpose of removing these products from the system that wash liquids are supplied and maintained separate from the liquid being treated. In certain cases where it is desirable to control or change the ion concentration in the liquid being treated or purified, it is desirable to flow such liquid directly through an electrode compartment, in which case an electrode compartment may be combined with a central compartment.

One of the objects of the present invention is to provide an electro-osmotic apparatus and process for supplying electrode wash liquid to the electrode compartments in a new and more advantageous fashion than hitherto customary.

Another object of the present invention is to provide an electro-osmotic apparatus and process in which the electrode wash liquid is supplied in part or whole by means of flowing a portion of the liquids being treated or purified into the electrode compartments.

A further object of the present invention is to provide a more compact arrangement for passing liquids through electrode and central compartments of a series of cells forming an electro-osmotic apparatus without the necessity of utilizing overhanging and suspended liquid conduit arrangements.

A still further object of the present invention is to provide an improved arrangement of anode and cathode compartments in electro-osmotic cells, and also to provide an improved arrangement of such cells when combined in series to form an electro-osmotic apparatus.

A still further object of the present invention is to provide an improved overflow arrangement which is especially adapted to be utilized in electro-osmotic purification and treatment apparatus.

Other objects will appear during the course of the following specification.

In a preferred embodiment of the present invention, to which it is by no means restricted, a series of three-compartment or five-compartment electro-osmotic cells are employed. In arranging these cells in the electro-osmotic unit, the electrodes are preferably staggered so that the outside electrodes of the different cells in the series will be of different sign from the adjacent outside electrodes in the next cells. The liquid or water being treated or purified is passed continuously through the central compartments in a three-compartment cell or through the intermediate compartments in a five-compartment cell through the series until it reaches the desired degree of purity, whereupon it is removed and utilized. Instead of supplying the electrode wash liquid from a separate pipe system, which is customarily suspended over the apparatus, a portion of the water in the central and intermediate compartments being treated is passed into the electrode compartments to wash the impure liquids or water therefrom. This flow is usually caused to take place by maintaining a higher level in the compartments containing the liquid being purified or treated than is contained in the electrode compartments. As a result when fluid communication is established between the central compartment and the electrode compartments a flow will ensue from the compartment containing the liquid being purified or treated to the electrode compartments. In the specific apparatus shown, a liquid conduit is usually arranged in the electro-osmotic apparatus so that its inlet will be approximately adjacent the top of the liquid in the central or intermediate compartment containing the liquid being purified or treated, while its outlet is adjacent the bottom of the electrode compartment. Each unit electro-osmotic cell may be separately supplied with electrode wash liquid in this manner, or the electrode wash liquid from one unit cell may be supplied to another or to a series of unit cells, thus obviating the necessity of having liquid communicating means in each unit cell between the central or intermediate compartments and the electrode compartments. The supply of liquid being purified or treated to the electrode compartments as wash liquid may be supplemented from other sources, and, if desired, certain of the electrode compartments may be washed in the manner hitherto customary, while others may be washed in the manner described in the present application.

The present invention is particularly advantageous inasmuch as it supplies electrode wash liquid to the electrode compartment of substantially the same degree of purity as the liquid being treated in the intermediate compartment, and as a result there is a lessened tendency for dissolved impurities in the water in the electrode compartment to move or seep into the central compartment and cause contamination thereof.

The arrangements and constructions illustrated and described in the present specification may be widely applied to electro-osmotic apparatus of varying shape and construction. When so applied a portion of the liquid to be or being treated, which has been withdrawn from one of the intermediate or last liquid treating compartments in the electro-osmotic apparatus, may be conducted successively through some or all of the electrode compartments. The accompanying drawings give an illustration of one form of apparatus, to which the present invention may be applied, but it is to be understood that it may also be applied to other forms of apparatus, such as that shown and described in the Heberle application Serial No. 64,099 filed October 22, 1925.

In the drawings attached hereto and forming part of my specification a number of embodiments of my invention are illustrated by way of example.

In the drawings

Figure 3:
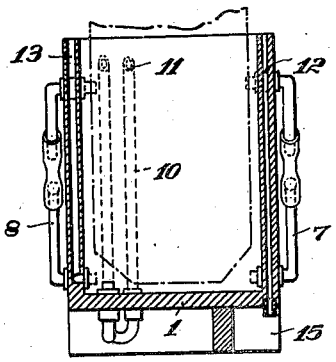
Figure 2:
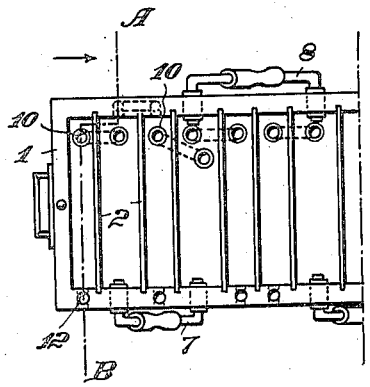
Figure 4:
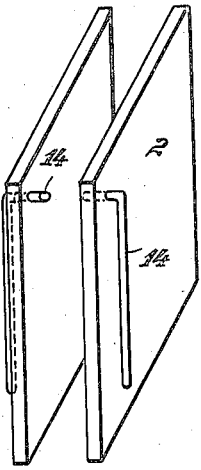
Figure 5:
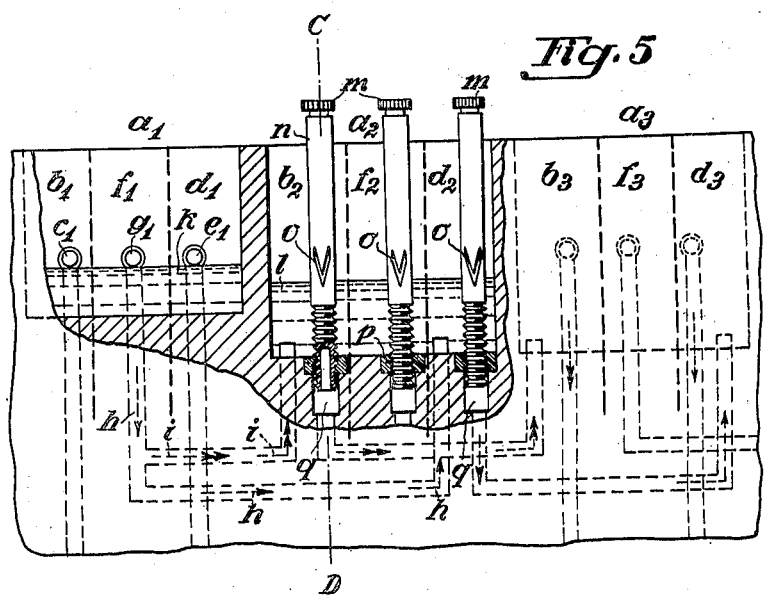
Figure 6:
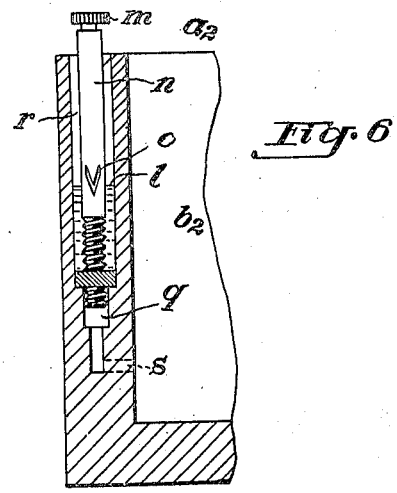

Fig. 1 is a vertical longitudinal section through part of an apparatus embodying my invention, Fig. 2, a plan of Fig. 1, Fig. 3, a sectional front elevation, the parts on the left of line A—B, Fig. 2, being cut away, Fig. 4, another modification of the invention in perspective view, Fig. 5, a vertical longitudinal section, and Fig. 6, a vertical cross-section through a still further modification.

Like parts are indicated by like numerals of reference throughout all the figures of the drawings.

Referring to Figs. 1 to 3 of the drawings, membranes 2 are placed vertically in tanks or vats 1 constructed preferably of wood, vulcanite, stoneware or cement. Into some of the compartments thus formed are introduced the electrodes 3 and 4, all of which are secured to a frame 5 which rests loosely upon the tank. Between the electrode compartments there are located the central treating or purifying compartments 6 for the reception of the liquid to be treated. The liquid is introduced into the first central compartment 6 and flows from this compartment through the pipe 7, Fig. 2, into the second central compartment, and from this second compartment through the pipe 8 into the third central compartment and so on.

For washing or flushing the electrode compartments liquid is allowed into said electrode compartments from the central compartments by means of suitable channels or ducts. For this purpose there are provided a series of J-shaped conduits or U-shaped pipes with unequal legs. The longer legs 10 of these pipes have inlets in the vicinity of the level of the liquid in the central compartments 6, while the shorter legs have outlets into the adjacent electrode compartments a little above the bottom 9 of the tank. The arrangement of connecting conduits described in the present embodiment has the particular advantage that the positions of the inlets and outlets thereof may readily be varied. This will result in a variation of the amount of liquid flowing from the central compartments to the electrode compartments. The wash water flows from the electrode compartments by the overflows 12, Fig. 3, which are preferably placed in the walls of the tanks 1. The discharged wash water is then conducted away by means of a gutter provided at 15.

It will be understood that instead of the connecting pipes 10 ducts may be provided in the walls, as indicated at 13 in Fig. 3, or connecting pipes may be utilized similar to those employed for the conveyance of liquid from one central compartment to the next (see conduits 7 and 8). The pipes or conduits 10 and the channels 13 may be of inverted T-shape (not shown), the outer ends of the T opening into the adjacent electrode compartments.

It is also possible to pass the pipes for supplying wash water to the electrode compartments through the membranes 2. In this case pipes 14 bent at right angles, as shown in Fig. 4, are preferably used, which pipes are passed through the membranes 2 and suspended thereby. Such a design is particularly suitable when employing ceramic diaphragms, while the arrangement of the pipes 10 as well as of the channels 13 according to Fig. 3 may be employed for any kind of membrane. The upper ends 11 of the pipes 10, the channels 13 and the pipes 14 are preferably bevelled, since this prevents the ingress of air bubbles.

It is not always necessary that a higher level be maintained in the central compartment containing the liquid being purified or treated than is maintained in the electrode compartments. If desired, the gravity flow caused by the difference in the level between the central compartment and the electrode compartment may be replaced by means of a pressure flow, as when the liquid in the central compartment is forced into such compartment under pressure or is put under pressure while in said central compartment. If desired my improved method of flushing may be applied to some of the electrode compartments only, for instance to the last, and the others may be flushed as heretofore by raw water or distilled water. The general application of my invention to all electrode compartments will, however, be found preferable, particularly on account of the compact construction of such an arrangement.

In the embodiment shown in Figs. 5 and 6 the arrangement is such that the liquid to be treated or the water to be purified is passed through the central or intermediate compartment of a series of electro-osmotic cells, while other portions of such liquid are caused to flow parallel to that portion being treated or purified from anode compartment to anode compartment, or from cathode compartment to cathode compartment. However, when the water or liquid reaches a fairly high degree of purity in the later electro-osmotic cells of the series, say for example the third cell from the end of the series, the electrode wash liquids which flowed in parallel up to this cell with the liquid being treated or purified are run off to waste or otherwise disposed of. For these last three cells the electrode wash liquid is made up in part or whole of the liquid or water being treated or purified in the central or electro-osmotic compartments of the cell. Each one of the last two to five cells, three being shown in the present embodiment, may be directly supplied with electrode wash liquid from its compartment containing the liquid being treated. However, in the embodiment shown the third cell from the end is connected, so that a certain amount of liquid being treated will flow into the electrode compartments, and after having flowed through the electrode compartments, such effluent electrode wash liquid will be caused to flow again in parallel with the liquid being treated or purified through the remaining cells. In Figs. 4 and 5, the electrode wash liquid which has flowed in parallel with the liquid being treated or purified until the cell $a_1$ is run to waste or otherwise disposed of by means of the outlets $c_1$ and $e_1$. The cell $a_1$ is provided with a central compartment $f_1$ and with electrode compartments $b_1$ and $d_1$. This cell is also provided with the diaphragms which are indicated by the heavy dotted lines. The electro-osmotic cells $a_2$ and $a_3$ are similarly constructed.

A certain portion of the liquid being treated or purified, which has reached a fairly high degree of purity by the time it has arrived in the central compartment $f_1$ is caused to overflow through the outlet $g_1$ into a conduit. Part of the liquid thus withdrawn from compartment $f_1$ flows, as indicated by the dotted single arrows $h$, into and through the cathode compartment $d_2$ of the second cell $a_2$ and after finally transversing the final cathode compartment of the cell $a_3$, it is discharged to waste or otherwise disposed of. Another portion of the liquid overflowing from the central compartment $f_1$ passes, as indicated by the double arrows $i$, into the anode compartment $b_2$ of the second cell $a_2$ and through the anode compartment $b_3$ of the third cell $a_3$ to waste or to some other place provided.

The major quantity of the liquid in the central compartment $f_1$ of the cell $a_1$ is passed into the central compartment $f_2$ of the second cell $a_2$ and after traversing it into the central compartment $f_3$ of the third cell $a_3$. The liquid discharged from the central compartment $f_3$ is then the final purified product.

To obtain the above described circulation of the flushing water through the anode compartments $b_2$ and $b_3$ and the cathode compartments $d_2$ and $d_3$, the level of the liquid $k$ in the cell $a_1$ is preferably kept slightly higher than the level 1 of the liquid in the cells $a_2$ and $a_3$. By the head thus created a uniform flow of the electrode wash water and also of the liquid to be treated is attained. In order to regulate the flow of the flushing water the special outlet connections illustrated in detail with reference to the cell $a_2$ are preferably used. These connections have a knurled head $m$ by the rotation of which the connection $n$ provided with a triangular inlet slot $o$ may be screwed in or out, so that the elevation of the opening $o$ may be varied.

The lower part of the outlet connection $n$ is threaded as indicated upon Fig. 5 and is adapted to be screwed into a tapped piece of vulcanite which may be cemented into position in the wall or bottom of the main cell structure. The lower portion of the outlet connection $n$ will then project downwardly and communicate with the passage $q$.

The outlet connection $n$ may also be placed in the side wall of the cell, as indicated in Fig. 6. In order to receive the outlet connection $n$, the side wall $r$ is enlarged or expanded and is provided with a well as shown. The inlet connection $n$ similarly communicates with a channel $q$, which last mentioned channel finally communicates with another channel $s$ at right angles thereto which is in communication with the next following cell compartment.

My improved apparatus enables in spite of its compact arrangement a simple and reliable regulation of the guidance of the liquid to be treated through the central compartments, as well as the guidance of the flushing water for the electrodes.

Various modifications and changes may be made without departing from the spirit and the scope of the invention, and I desire, therefore, that only such limitations shall be placed thereon as are imposed by the prior art.

In the accompanying claims the expression electro-osmotic cell is intended to include two, three, five or other numbered compartment cells, containing at least one anode and one cathode, which electrodes are in electrical communication with each other through the body of liquid being treated or the water being purified and are separated by one or more permeable diphragms. In the preferred embodiment the cells are arranged in series and the anode and cathode of each cell are separated by a compartment containing the liquid or water being treated or purified.

I claim as my invention:

1. An apparatus for the electro-osmotic purification of liquids comprising an electro-osmotic cell provided with a liquid conduit extending from near the level of the liquid in the liquid treating compartment to a point slightly above the bottom of the electrode compartment, said conduit serving to transfer a portion of the liquid being treated from the liquid treating compartment to the electrode compartment.

2. An apparatus for the electro-osmotic purification of liquids, comprising an electro-osmotic cell, a U-shaped conduit extending from near the level of the liquid in the liquid treating compartment to a point slightly above the bottom of the electrode compartments, said conduit serving to transfer a portion of the liquid being treated from the liquid treating compartment to the electrode compartment.

3. An apparatus for the electro-osmotic purification of liquids comprising an electro-osmotic cell provided with a conduit extending from near the level of the liquid in the liquid treating compartment to the electrode compartment, said conduit serving to transfer a portion of the liquid being treated to the electrode compartment, the inlet opening of the conduit being located adjacent the liquid level and being positioned so as to be at an angle to the liquid level.

4. An electro-osmotic apparatus provided with a series of electro-osmotic cells, having liquid treating compartments in liquid communication with the electrode compartments by means of liquid conduits, the level of the liquid in the liquid treating compartment being higher than the level in the electrode compartment, and the inlets of the conduits in the liquid treating compartment being adjustable.

5. An electro-osmotic apparatus consisting of a basin or tank-like structure into which are fitted a series of permeable and impermeable diaphragms for forming a series of electro-osmotic cells, the liquid treating compartments being in communication with and being adapted to supply water to the electrode compartment by means of J-shaped conduits, the longer leg of the J extending upwardly in the liquid treating compartment, the shorter leg of the J extending upwardly in the electrode compartment and the lower curved portion of the J being positioned adjacent the bottom of the compartment.

6. An electro-osmotic apparatus consisting of a series of electro-osmotic cells placed side by side, the liquid treating compartments being in liquid communication with and adapted to supply wash liquid to electrode compartments, said communicating means consisting in part of a conduit adapted to extend upwardly within the liquid treating compartment and being provided with an angular orifice adjacent the level of the liquid in said liquid treating compartment.

OSWALD GERTH.